United States Patent
Pirrung et al.

(10) Patent No.: US 7,173,084 B2
(45) Date of Patent: Feb. 6, 2007

(54) LEVELLING AGENT AND ANTI-CRATERING AGENT

(75) Inventors: Frank Oliver Heinrich Pirrung, Oudehaske (NL); Elizabeth Maaike Loen, Leeuwarden (NL); Lothar Alexander Engelbrecht, Heerenveen (NL); Arend Noordam, VJ Oranjewoud (NL)

(73) Assignee: EFKA Additives B.V., SN Nijehaske (NL)

( * ) Notice: Subject to any disclaimer, the term of this patent is extended or adjusted under 35 U.S.C. 154(b) by 161 days.

(21) Appl. No.: 10/491,814

(22) PCT Filed: Oct. 8, 2002

(86) PCT No.: PCT/EP02/11237

§ 371 (c)(1),
(2), (4) Date: Apr. 6, 2004

(87) PCT Pub. No.: WO03/033603

PCT Pub. Date: Apr. 24, 2003

(65) Prior Publication Data

US 2004/0236007 A1   Nov. 25, 2004

(30) Foreign Application Priority Data

Oct. 17, 2001  (EP) .................................. 01203965

(51) Int. Cl.
*C08F 18/20* (2006.01)

(52) U.S. Cl. ...................... 524/544; 524/556; 526/245; 526/317.1; 526/319; 526/330; 526/335

(58) Field of Classification Search ............... 524/544, 524/556; 526/319, 317.1, 245, 335, 330
See application file for complete search history.

(56) References Cited

U.S. PATENT DOCUMENTS

| | | | | |
|---|---|---|---|---|
| 4,075,237 A | | 2/1978 | Kleiner et al. ............... 260/455 |
| 4,094,685 A | * | 6/1978 | Lester et al. .................... 521/76 |
| 5,030,684 A | | 7/1991 | Rauch-Puntigam et al. . 524/513 |
| 5,037,920 A | * | 8/1991 | Kriessmann et al. ......... 526/245 |
| 5,770,656 A | * | 6/1998 | Pechhold .................. 525/326.4 |

FOREIGN PATENT DOCUMENTS

| | | |
|---|---|---|
| DE | 1918079 | 10/1969 |
| EP | 0537669 | 4/1993 |
| EP | 0776914 | 6/1997 |
| EP | 776914 A1 * | 6/1997 |
| WO | WO-96/05237 * | 2/1996 |

OTHER PUBLICATIONS

Derwent Abstract 2000-332358 [29] for JP 2000102727 (2000).

* cited by examiner

*Primary Examiner*—David W. Wu
*Assistant Examiner*—Henry S. Hu
(74) *Attorney, Agent, or Firm*—Joseph C. Suhadolnik

(57) ABSTRACT

Use of a polymer as a levelling agent or anti-cratering agent, said polymer comprising at least one fluorinated unit represented by formula 1, (Formula 1) wherein $R^1$ is a moiety represented by $C_nF_{2n+1}-(CH_2)_m-$, $AC_nF_{2n}-(CH_2)_m-$, $C_nF_{2n+1}-(CH_2)_m-(OCH_2CHR_5)_p-$, $AC_nF_{2n}-(CH_2)_m-(OCH_2CHR_5)_p-$ $C_nF_{2n+1}-(CH_2)_m-X-$, $AC_nF_{2n}-(CH_2)_m-X-AC_nF_{2n}-(CH_2)_m-(OCH_2CHR_5)_p-X$ or $C_nF_{2n+1}-(CH_2)_m-(OCH_2CHR_5)_p-X-$; wherein A=H, Cl, Br, I, a $C_1-12$ alkyl or a $OC_1-12$ alkyl, wherein $4 \leq n \leq 20, 0 \leq m \leq 4$ and $0 \leq p \leq 20$, wherein X is a spacer moiety selected from the group consisting of esters, amides, sulphoamides, mercapto groups, poltyurethane groups and alkyl groups, wherein $R^2$ is H, a metal moiety, an (alkyl)ammonium moiety or an alkyl group, $C_nF_{2n+1}-(CH_2)_m-$, $AC_nF_{2n}-(CH_2)_m-$, $C_nF_{2n+1}-(CH_2)_m-(OCH_2CHR_5)_p-$, $AC_nF_{2n}-(CH_2)_m-(OCH_2CHR_5)_p-$ $C_nF_{2n+1}-(CH_2)_m-X-$, $AC_nF_{2n}-(CH_2)_m-X-$, $AC_nF_{2n}-(CH_2)_m-(OCH_2CHR_5)_p-X$ or $C_nF_{2n+1}-(CH_2)_m-(OCH_2CHR_5)_p-X-$; wherein A=H, Cl, Br, I, $C_1-12$ alkyl or $OC_{1-12}$ alkyl, wherein $4 \leq n \leq 20$, $0 \leq m \leq 4$ and $0 \leq p \leq 20$, wherein X is a spacer moiety selected from the group consisting of esters, amides, sulphoamides, mercapto groups, polyurethane groups and alkyl groups, wherein $R^3$ and $R^4$ are independently selected from the group consisting of H, alkyl-groups and phenyl-groups and wherein $R^5$ is H and/or methyl group.

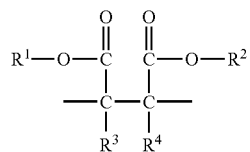

(1)

19 Claims, No Drawings

LEVELLING AGENT AND ANTI-CRATERING AGENT

The invention relates to the use of a polymer comprising a fluoroester as a levelling agent or anti-cratering agent. The invention further relates to particular polymers, which contain fluoro-ester moieties.

Difficulties related to the application of liquid resin solutions (liquid systems) such as paint, printing ink, plastic compounds and the like, to solid substrates are generally known in the art, in particular when the surface tension of the liquid system is high, and the surface tension of the solid substrate is lower.

Such liquid systems are typically composed of solvents, resins, and optionally pigments, extenders and additives. In particular, modern synthetic resins have a higher intrinsic surface tension by design and function, in comparison to traditional resins based on natural fatty acids and oils. Thus it may be more difficult to apply modern liquid systems such as modern 2-component systems like epoxies, polyester/melamines or polyurethanes, than to apply (conventional) alkyds.

If water is employed as a solvent, the surface tension of the liquid formulation is high by definition. This obligates the technician to use levelling and anti-crater agents to obtain an esthetic surface, which ensures its protective function through an uniform film. By reduction of the surface tension of the liquid system to a value below the surface tension of the substrate, spreading of the liquid is improved and the surface may level out to obtain an esthetically more attractive film. Craters are caused by contaminates, which enter the liquid film from the outside, or are already present on the substrate. In order to avoid cratering, the liquid systems need to have a lower surface tension than the contaminate itself, usually silicone or mineral oil droplets.

For the purpose of levelling, substrate wetting and anti-cratering, the market offers a variety of products, ranging from organically modified polysiloxanes to fluorocarbons, waxes and other anionic, cationic or electroneutral organic surfactants, which however show well-known disadvantages such as foam formation, foam stabilisation, surface slip, overcoatability problems, and incompatibility in the liquid systems, causing craters, haze, loss of gloss, migration, sweating and poor storage stability.

It has unexpectedly been found that by providing a polymer with an amount of fluorocarbons, the levelling and anti-cratering behaviour of a liquid resin systems can be achieved, without leading to overcoatability problems.

The use of a number of fluorinated polymers as dirt and stain repellents is known from U.S. Pat. No. 4,075,237 and U.S. Pat. No. 5,770,656. The polymers described herein are applied to a finished substrate. When applied as such, such polymers usually lead to formation of craters and problems of overcoatability, due to their hydrophobicity, extremely low surface tension and their high content of fluorocarbons, which is the basis of their performance as a dirt and stain repellent.

It has now been found that particular polymers comprising an effective amount of certain ester moieties of unsaturated dicarboxylic-acids with certain fluorinated units are very suitable anti-cratering and/or levelling agents.

Accordingly, the present invention relates to the use of a polymer as a levelling agent or anti-cratering agent, said polymer comprising one or more fluorinated units represented by formula I,

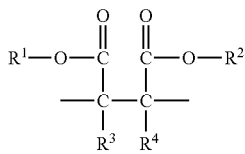

(Formula I)

wherein $R^1$ is a moiety represented by $C_nF_{2n+1}$—$(CH_2)_m$—, $AC_nF_{2n}$—$(CH)_m$—, $C_nF_{2n+1}$—$(CH_2)_m$—$(OCH_2CHR^5)_p$—, $AC_nF_{2n}$—$(CH_2)_m$—$(OCH_2CHR^5)_p$, $C_nF_{2n+1}$—$(CH_2)_m$—X—, $AC_nF_{2n}$—$(CH_2)_m$—X—, $AC_nF_{2n}$—$(CH_2)_m$—$(OCH_2CHR^5)_p$—X or $C_nF_{2n+1}$—$(CH_2)_m$—$(OCH_2CHR^5)_p$—X;

wherein A=H, Cl, Br, I, a $C_{1-12}$ alkyl or a —$OC_{1-12}$alkyl, wherein $4 \leq n \leq 20, 0 \leq m \leq 4$ and $0 \leq p \leq 20$, wherein X is a spacer moiety selected from the group consisting of esters, amides, sulphoamides, mercapto groups, polyurethane groups and alkyl groups, wherein $R^2$ is H, a metal moiety, an (alkyl)ammonium moiety or an alkyl group, $C_nF_{2n+1}$—$(CH_2)_m$—, $AC_nF_{2n}$—$(CH_2)_m$—$C_nF_{2n+1}$—$(CH_2)_m$—$(OCH_2CHR^5)_p$—, $AC_nF_{2n}$—$(CH_2)_m$—$(OCH_2CHR^5)_p$, $C_nF_{2n+1}$—$(CH_2)_m$—X—, $AC_nF_{2n}$—$(CH_2)_m$—X—$AC_nF_{2n}$—$(CH_2)_m$—$(OCH_2CHR^5)_p$—X or $C_nF_{2n+1}$—$(CH_2)_m$—$(OCH_2CHR^5)_p$—X;

wherein A is H, Cl, Br, I, $C_{1-12}$ alkyl or —$OC_{1-12}$alkyl, wherein $4 \leq n \leq 20, 0 \leq m \leq 4$ and $0 \leq p \leq 20$, wherein X is a spacer moiety selected from the group consisting of esters, amides, sulphoamides, mercapto groups, polyurethane groups and alkyl groups, wherein $R^3$ and $R^4$ are independently chosen from the group consisting of H, alkyl-groups and phenyl-groups and wherein each $R^5$ may be a H or a methyl group.

The use of a polymer according to the invention gives benefits such as complete wetting of the substrate. It may also help to prevent the formation of craters and pin-holes, to provide a smooth and/or equal levelling of the paint film without orange peel leading to improved esthetics of the dry film. Also, edge crawling, air-draft sensitivity, fish eyes and/or other dewetting effects of the liquid resin solution during the drying stage may be avoided or at least reduced significantly. Also, Bénard cells may be hidden and telegraphing may be avoided or reduced. Bénard cells are caused by turbulent movements of pigments in paint and the like during drying. Telegraphing is caused by areas of different surface tension in the substrate, which is transmitted to the top surface of the paint film. By adding a levelling agent in accordance with the invention, the surface may be straightened.

Additionally, it has been found that such a polymer exhibits low foam properties, which extend its use in comparison to conventional surfactants like polysiloxanes, ionic and electroneutral organic compounds, fluorocarbons and the like, to be used as defoaming agents. All this may be achieved without loosing overcoatability of the dry film.

In a preferred embodiment the one or more fluorinated units of the polymer are represented by formula I wherein n is 4–14, more preferably 6–10.

Very good results have been achieved when using a polymer wherein at least 50%, preferably 70–100% of the fluorinated units of the polymer are represented by formula I wherein n is 4–10, preferably 6–10, and particularly wherein n is 6 or 8.

In another preferred embodiment the number of $CH_2$ units (m) in $R^1$ and optionally in $R^2$ is 1, 2, or 3. More preferably m in $R^1$ and/or $R^2$ is 2.

In another preferred embodiment the number of —$(OCH_2CHR^5)$ units (p) in $R^1$ and optionally in $R^2$ is 0, 6, 7 or 8.

In a preferred embodiment of the invention at least 50%, preferably 90–100% of the fluorinated monomeric units are mono-esters. An advantage of using a polymer with a high level of monoesters, is related to the ease of manufacturing such esters. Another advantage of such a polymer is the fact that it can be rendered water-soluble in an efficient way through neutralisation of the remaining $CO_2H$-groups.

Very goods results have also been achieved with a polymer wherein at least the majority of the $R^1$ moieties and optionally at least the majority of the $R^2$ represent a linear fluoroalkyl moiety.

Examples of particularly preferred fluorinated units ($R^1$, $R^2$) are (1H,1H,2H,2H)-pentadecafluorooctyl, (1H,1H,2H,2H)-heptadecafluorodecyl, (1H,1H,9H)-hexadecafluorononyl, (1H,1H,7H)-dodecafluoroheptyl, N-butyl and N-ethyl perfluorooctane sulphonamido ethyl, (1H,1H,2H,2H)-pentadecafluorooctyl heptaethoxylate and (1H,1H,2H,2H)-heptadecafluorodecyl heptaethoxylate.

Preferred examples of spacers (X) in $R^1$ and/or $R^2$ include esters, e.g. —O—CO$(CH_2)_x$— or —CO—O$(CH_2)_x$—, amides, e.g. —NRCO$(CH_2)_x$— or —CONR$(CH_2)_x$—, sulphoamides, e.g. —$SO_2NR(CH_2)_x$—, mercapto groups, e.g. —$S(CH_2)_x$—, polyurethane, e.g. —O—CONH$(CH_2)_x$— or —NH—$CO_2(CH_2)_x$—, ethers, e.g. —O$(CRHCH_2)_x$—, linear or branched alkyl, e.g. —$(CRH)_x$— or alkenyl, e.g. —CR=CR$(CRH)_x$—, wherein x=0–12 and R=H or $C_{1-12}$ alkyl.

It has been found that the present invention offers very good anti-cratering features and/or may very well be used as a levelling agent in a variety of applications, e.g. in coatings and inks such as aqueous systems (e.g. emulsion laquers, such as lacquers based upon polyurethane, alkyds, acrylics, polyester-melamine), water-reducible systems (2K-polyurethane, alkyd, acrylic, epoxy, vinyl copolymers), (organic) solvent based systems (e.g. polurethane-based, stoving alkyd/melamine- or polyester/melamine-based, epoxy-based, air-drying alkyds, nitrocellulose, CAB, unsaturated polyesters, acrylics, silicone resins, UV/EB-curing resins, vinyl copolymers, chlorinated rubber) and plastic compounds (hot and ambient curing unsaturated polyesters, epoxy, polyurethanes, polyvinylchloride).

A polymer used in accordance with the invention may be a co-polymer of different fluorinated units as defined by formula I. However, the polymer may also comprise other monomeric units (also referred to as co-monomers).

Examples of suitable comonomers are alkyl vinyl ethers, such as methyl vinyl ether, isopropyl vinyl ether, isobutyl vinyl ether, vinyl 2-methoxy ethyl ether, n-propyl vinyl ether, t-butyl vinyl ether, isoamyl vinyl ether, n-hexyl vinyl ether, 2-ethylbutyl vinyl ether, diisopropylmethyl vinyl ether, 1-methyl-heptyl vinyl ether, n-decyl vinyl ether, n-tetradecyl vinyl ether, and n-octadecyl vinyl ether.

Also, vinyl ethers of the following amino alcohols: ethanolamine vinyl ether, 2-dimethylamino ethanol vinyl ether, N-hydroxyethyl-m-toluidine vinyl ether, hydroxyethyl butyl aniline vinyl ether, and .beta.-piperidinoethanol vinyl ether, and the like.

Also useful are gamma substituted ethers, such as .alpha.-methylvinyl methyl ether, .alpha.-methylvinyl ethyl ether, .alpha.-amylvinyl methyl ether, and .alpha.-phenylvinyl ethyl ether; alicyclic and aralkyl vinyl ethers such as cyclohexanol vinyl ether, menthol vinyl ether, carvacrol vinyl ether, benzyl alcohol vinyl ether, .beta.-phenylethanol vinyl ether, tetrahydronaphthol vinyl ether, .beta.-decahydronaphthol vinyl ether, methylphenyl carbinol vinyl ether, butyl-cyclohexanol vinyl ether, and dihydroabictinol vinyl ether.

Additionally, vinyl aryl ethers such as vinyl phenyl ether, .alpha.-bromovinyl phenyl ether, .alpha.-phenylvinyl phenyl ether, vinyl m-cresyl ether, .alpha.-methyl vinyl p-cresyl ether, vinyl p-chiorophenyl ether, vinyl 2,4,6-trichlorophenyl ether, and vinyl .alpha.-naphthyl ether. Useful copolymers of the polymers may be formed with vinyl esters, e.g. vinyl acetate, vinyl esters of substituted acids, such as for example, vinyl methoxyacetate, vinyl trimethylacetate, vinyl isobutyrate, isopropenyl butyrate, vinyl lactate, vinylcaprylate, vinyl pelargonate, vinyl myristate, vinyl oleate and vinyl linoleate; vinyl esters of aromatic acids, such as vinyl benzoate, vinyl alkoxybenzoates, vinyloctylphthalate, vinyl tetrachlorobenzoate, vinyl . beta.-phenyl butyrate, vinyl . beta .-naphthoate, and vinyl ethyl phthalate; vinylformate and vinylcarbonate derivatives such as vinylformate, vinylchloroformate, methylvinylchloroformate, vinyl methyl carbonate, vinylethylcarbonate, vinyiphenylcarbonate and vinylidenecarbonate; vinyl thioesters such as vinyl methyl sulphide, vinyl n-butyl sulphides, 1-chloroethyl vinyl sulphides, 2-chloroethyl vinyl sulphide, vinyl dodecyl sulphide, vinyl phenyl sulphide, vinyl o-cresyl sulphide, vinyl 2,5-dimethyl-4-chlorophenyl sulphide, vinyl 8-chloronaphthyl sulphide, and vinyl 2-benzothiazylsulphide.

Also useful as comonomers are styrene and related monomers which copolymerise readily with the novel esters of this invention such as o-methylstyrene, p-methylstyrene, 3,4-dimethyl styrene, 2,4,6-trimethyl styrene, in-ethyl styrene, 2,5-diethyl styrene, p-butyl styrene, m-t-butyl styrene, p-benzyl styrene, o-methoxy styrene, p-methoxystyrene, 6-methoxy-3-methyl styrene, 2,6-dimethoxy styrene, and 2-methoxy-5-isopropyl styrene; derivatives of .alpha.-methyl styrene, such as: 4-chloro-.alpha.-methyl styrene, 3,4-dimethyl-.alpha.-methylstyrene, 3-bromo-2-methyl-.alpha.-methylstyrene, and 2,5-dichloro-.alpha.-methylstyrene; chlorostyrene derivatives, such as m-chlorostyrene, 2,3-dichlorostyrene, 3,4-dichlorostyrene, trichlorostyrene, and pentachlorostyrene; bromo- and fluorostyrene derivatives, such as p-bromostyrene, m-fluorostyrene, m-trifluoromethyl styrene, 4-fluoro-3-trifluoromethyl styrene, and pentafluorostyrene; other styrene derivatives such as p-formylstyrene, methyl ester of p-vinyl benzoic acid, p-vinylbenzyl alcohol, 1,4-dimethyl-2-hydroxystyrene, 3,5-dibromo-4-hydroxystyrene, 2-nitro-4-isopropylstyrene, p-N,N-dimethyl amino styrene, N-(vinyl benzyl) pyrrolidine and sulphoamido styrene; vinyl derivatives of biphenyl, naphthalene and related aromatic compounds, such as 4-chloro-4'-vinyl biphenyl, o-isopropenyl biphenyl, p-vinyl diphenyl oxide, 4-chloro-1-vinyl naphthalene, 1-chloro-4-vinyl naphthalene and 1-vinyl acinaphthalene; vinylfuran, vinylbenzofuran, vinylimidazole and vinylpyridine, such as 2-vinyl dibenzofuran, 5-ethyl-2-vinyl-thiophene, 5-chloro-2-vinyl thiophene, 3,4,5-trichloro-2-vinyl thiophene and 2-vinyl dibenzothiophene.

Additional useful comonomers are ethylene and chloro-, fluoro- and cyano-derivatives of alkylene, such as ethylene, vinylchloride, vinylidene-chloride, vinylfluoride, vinylidene fluoride, acrylonitrile, methacrylonitrile, tetrafluoroethylene, trifluorochloroethylene, hexafluoropropylene; acrylate and methacrylate monomers, particularly those with 1 to 12 carbon atoms in the ester groups such as monofluoroethyl methacrylate, n-propyl methacrylate, 2-methyl cyclohexyl methacrylate, ethylene glycol mono-methacrylate, .beta.-bromoethyl methacrylate, .beta.-phenyl ether methacrylate, o-cresyl methacrylate, and .beta.-naphthyl methacrylate, methyl methacrylate, t-butyl methacrylate, n-butyl methacrylate, methylacrylate, ethylacrylate, propylacrylate, butylacrylate, 3-methyl-1-pentylacrylate, octylacrylate, tetradecylacrylate, s-butylacrylate, 2-ethylhexyl acrylate, 2-methoxyethyl acrylate, and phenyl acrylate, acrylic acid, methacrylic acid, .alpha.-halogen acrylates, such as methyl chloro acrylate, methyl bromo acrylate, ethyl chloro acrylate, s-butyl chloro acrylate, cyclohexyl chloro acrylate, phenyl chloro acrylate, cyclohexyl bromo acrylate, n-propyl chloro acrylate, isopropyl chloro acrylate, n-butylchloro acrylate, and methyl fluoro acrylate; dienes particularly 1,3-butadiene, isoprene, and chloroprene, 2-fluoro-butadiene, 1,1,3-trifluorobutadiene, 1,1,2,3-tetrafluoro butadiene, 1,1,2-trifluoro-3,4-dichlorobutadiene and tri- and pentafluoro butadiene and isoprene; nitrogen-vinyl monomers such as N-vinylimides, amides, and secondary cyclic amines, like vinyl succinimide, vinyl pyrrolidone, N-vinyl carbazole and the like.

Preferred co-monomers include alkyl(meth)acryiate units and/or (meth)acrylic acid and/or other vinylic compounds capable of forming polymerisable radicals (e.g. styrene, n-propyl methacrylate, 2-methyl cyclohexyl methacrylate, ethylene glycol mono-methacrylate, tert-butylacrylate, iso-butyl methacrylate, iso-butyl acrylate, o-cresyl methacrylate, t-butyl methacrylate, n-butyl acrylate, n-butyl methacrylate, methylacrylate, methyl methacrylate, ethylacrylate, propylacrylate, iso-propyl methacrylate, 3-methyl-1-pentylacrylate, octylacrylate, tetradecylacrylate, s-butylacrylate, s-butyl methacrylate, 2-ethylhexyl acrylate, 2-ethylhexyl methacrylate, 2-methoxyethyl acrylate, phenyl acrylate, acrylic acid, methacrylic acid 1,3-butadiene, isoprene, vinyl pyrrolidone, acrylonitrile, methacrylonitrile, vinylimidazole and vinylpyridine, p-methylstyrene, 3,4-dimethyl styrene, m-ethyl styrene, p-butyl styrene, o-methoxy styrene, p-methoxystyrene, 2,6-dimethoxy styrene, isopropyl vinyl ether, isobutyl vinyl ether, vinyl 2-methoxy ethyl ether, n-hexyl vinyl ether, 2-ethylbutyl vinyl ether, n-octadecyl vinyl ether, .alpha.-methylvinyl ethyl ether, cyclohexanol vinyl ether, benzyl alcohol vinyl ether, vinyl phenyl ether, vinyl acetate, vinyl methoxyacetate, vinyl isobutyrate, vinyl oleate, vinyl benzoate, vinyloctylphthalate).

The co-polymer, may for example be a random copolymer, an alternating copolymer or a block copolymer. Preferably the co-polymer is a random copolymer.

The fluorinated polymer, used as an anti-cratering agent or levelling agent, may be present in a product (e.g. such as specified above) within a wide concentration range, of which the skilled professional will be able to determine a suitable concentration for a particular application.

Inter alia when the polymer is used in aqueous or organic solvent based lacquers, very good results have been achieved with a product comprising 0.1–10 wt. %, preferably 0.2–2.5 wt. %, more preferably 0.4–1.5 wt. % of the fluorinated polymer. The amount of fluorinated units in the copolymer may be widely varied. In a preferred embodiment for a use according to the invention, the fluorinated polymer comprises 0.1–30 wt. % of the fluorinated units. When used as a levelling agent, very good results have been achieved with a composition (e.g. an aqueous or organic solvent based resin solution) containing a fluorinated polymer comprising 0.2–10 wt. % of the fluorinated units. Particularly good results have been achieved with a composition comprising a fluorinated polymer as a levelling agent wherein the fluorinated polymer comprises 0.5–4 wt. % of the fluorinated units.

In a particularly preferred use as an anti-cratering agent, the fluorinated polymer comprises 2–25 wt. % of the fluorinated units. Excellent results have inter alia been achieved when using a fluorinated polymer comprising 10–18 wt. % of the fluorinated units.

The present invention further relates to a novel polymer comprising at least one fluorinated monomeric unit represented by formula I, further comprising one or more alkyl (meth)acrylate units and/or (meth)acrylic acid and/or other moieties originating from vinylic compounds that can form radicals (e.g. styrene, n-propyl methacrylate, 2-methyl cyclohexyl methacrylate, ethylene glycol mono-methacrylate, tert-butylacrylate, iso-butyl methacrylate, iso-butyl acrylate, o-cresyl methacrylate, t-butyl methacrylate, n-butyl acrylate, n-butyl methacrylate, methylacrylate, methyl methacrylate, ethylacrylate, propylacrylate, iso-propyl methacrylate, 3-methyl-1-pentylacrylate, octylacrylate, tetradecylacrylate, s-butylacrylate, s-butyl methacrylate, 2-ethylhexyl acrylate, 2-ethylhexyl methacrylate, 2-methoxyethyl acrylate, phenyl acrylate, acrylic acid, methacrylic acid 1,3-butadiene, isoprene, vinyl pyrrolidone, acrylonitrile, methacrylonitrile, vinylimidazole and vinylpyridine, p-methylstyrene, 3,4-dimethyl styrene, m-ethyl styrene, p-butyl styrene, o-methoxy styrene, p-methoxystyrene, 2,6-dimethoxy styrene, isopropyl vinyl ether, isobutyl vinyl ether, vinyl 2-methoxy ethyl ether, n-hexyl vinyl ether, 2-ethylbutyl vinyl ether, n-octadecyl vinyl ether, .alpha.-methylvinyl ethyl ether, cyclohexanol vinyl ether, benzyl alcohol vinyl ether, vinyl phenyl ether, vinyl acetate, vinyl methoxyacetate, vinyl isobutyrate, vinyl oleate, vinyl benzoate, vinyloctylphthalate). These polymers have been found to be very suitable as a wetting agent, an anti-cratering agent, a levelling agent, a binding agent, a dirt and stain repellent or a sizing agent. Particularly preferred alkyl(meth)acrylates in a novel polymer according to the invention or a polymer used in accordance with the invention include n-propyl(meth)acrylate, iso-propyl(meth)acrylate, n-butyl(meth)acrylate, sec-butyl(meth)acrylate, tert-butyl(meth)acrylate, iso-butyl(meth)acrylate, ethylhexyl(meth)acrylate and (meth)acrylic acid.

In a much preferred polymer according to the invention, $R^1$, and optionally $R^2$, represent linear fluoroalkyl moieties.

A polymer according to the invention or a polymer used in accordance to the invention preferably has a number average molecular weight in the range of 1,000 to 50,000 g/mol, more preferably in the range of 2,000 to 20,000 g/mol, e.g. in the range of 2,500 to 4,000 g/mol.

Very good results have also been achieved with a polymer having a polydispersity ($M_w/M_n$) in the range of 1–4, e.g. 1.1–2.

The polymer may be a living polymer, e.g. obtained by anionic polymerisation, atom transfer mechanism, nitroxide mediated techniques or other controlled polymerisation techniques. A benefit of a living polymer is its tailor-made molecular architecture, combined with a narrower molecular weight distribution leading to smaller melting ranges and lower viscosities.

Very good results have also been obtained with a polymer in the form of a liquid or a solid (e.g. a powder), which is soluble in an organic solvent or in water, or made water-soluble after neutralization of acidic moieties. Such a system is particularly suitable for water-based systems.

Suitable neutralizing agents for neutralising acidic moieties are e.g. dimethylethanolamine, ammonia, other primary, secondary or tertiary amines or alkali hydroxides. An advantage of using a volatile amine neutralizing agent is that during the drying phase of a paint film, the amine neutralizing agent evaporates, leaving behind a more water resistant polymer.

In principle, a polymer comprising at least one fluorinated unit represented by formula I may be prepared in anyway, e.g. by a thermal radical, controlled radical, anionic or cationic polymerisation technique, of which the skilled professional will know how to employ them. The monomer compounds of the present invention may be prepared following procedures familiar to those skilled in the art.

Starting materials employed are generally commercially available and/or may be prepared readily according to methods familiar to those skilled in the art.

It is to be understood that the perfluoroalkyl group may, if desired, be a mixture of varying chain length since basic starting materials are often obtained by telomerization procedures yielding fluoroalkyl groups of varying length. U.S. Pat. No. 3,226,449 is illustrative of one method useful for the preparation of certain perfluoroalkyl iodides which may be employed as starting materials in making the monomers for preparing a polymer of the present invention.

The ester monomers of this invention can generally be prepared by well known esterification reactions between: cyclic anhydrides and perfluorinated alcohols, acids and perfluorinated alcohols or alkyl esters and perfluorinated alcohols, Of course, it is understood that the corresponding mercaptans and amines may be used in lieu of the alcohols. The esterifications may be carried out in the absence of a catalyst.

Typically, the fluorinated alcohol is mixed with an equimolecular amount of maleic anhydride, and heated to >40° C., at which temperature the exothermic ring opening of the cyclic anhydride starts to take place to form the monomaleate of the fluorinated alcohol. This reaction can be carried out without addition of a solvent or catalyst, but optionally can take place in non-protic solvents like esters, aromatic hydrocarbons, ketons and the like at concentration of not less than 50%. As catalysts, metal salts and metal complexes can be added at <1%, such as dibutyl tin dilaurate and tetraisopropyl titanate. The conversion can be determined by $^1$H-NMR or by measurement of the acid value.

For the synthesis of a diester of maleic acid, the monoester is formed as above and the second ester is practically esterified at temperatures above 150° C. in the presence of a solvent that forms an azeotrope with the formed reaction water like xylene and a catalyst such as p-toluenesulphonic acid.

Other methods to obtain mono- and difluoroalkyl esters of maleic acid from fluorinated alcohols are transesterification reactions with maleic diesters of low boiling alcohols such as diethylmaleate and dibutylmaleate, by which the alkyl groups of the esters are exchanged by the fluoroalkylchains, in the presence of an organic titanate and optionally a solvent at elevated temperatures, under removal of the liberated alkyl alcohol.

When the corresponding amines, e.g. pentadecafluorooctyl amine, are used instead of the alcohols, maleimides are formed instead of the half esters of maleic acid, if the reaction is conducted with equimolar amounts of the maleic anhydride or maleic acid and the fluorinated amine.

Polymerisation of the obtained mono- or difluoroalkyl maleic derivatives may be carried out in bulk, solution, suspension, or emulsion.

As indicated above, the monomers suitable for preparing a polymer in accordance with this invention may be copolymerised with one or more other ethylenically unsaturated comonomers. A preferred polymerisation technique is thermal random solution polymerisation.

In thermal random solution polymerisation, the monomer or mix of monomers is/are added over a period of time to a suitable solvent such as aromatic and aliphatic hydrocarbons (e.g. xylene, toluene), ketones (e.g. aceton, butanone, methyl isobutyl ketone), esters (e.g. ethyl acetate, butyl acetate, methoxy propyl acetate), alcohols (e.g. s-butanol, iso-butanol, iso-propanol, (poly)ethylene glycol, (poly)propylene glycol), water, glacial acetic acid or mixtures thereof in a reaction vessel using initiators such as azobisisobutyronitrile or other azo initiators, or di-tert-butylperoxide or other peroxides and peroxyesters at concentrations of 0.1 to 5.0% at reaction temperatures of 40 to 160° C., e.g. under nitrogen.

Valuable copolymers are obtained by polymerisation of the foregoing perfluorinated monomers with other polymerisable monomers having ethylene unsaturation, such as mentioned above The invention further relates to compositions comprising a novel polymer according to the invention. A polymer according to the invention may for example very suitably be used in a composition like a coating, printing ink or plastic compound.

Such a product may for example further comprise one or more pigments, e.g. chosen from the group consisting of phthalocyanines, carbon black, titanium dioxide, ferrous oxides, alumino silicates, quinacridones, anthroquinones, diketopyrrolo-pyrrole, benzimidazolones and isoindolinones, one or more extenders, e.g. calcium carbonate, barium sulphate, silicium dioxide, alumium trihydroxide, organic fibres, glass and optionally one or more dispersants, e.g. polyurethane dispersants, polyester dispersants, polyacrylate dispersants, polyether derivatives, fatty acid derivatives, alkylsulphates.

A polymer according to the invention may very suitably be used in a dispersion, comprising 0–85%, by weight, preferably 3 to 70%, of pigment and/or extender, 0.1–5% by weight, preferably 0.4 to 1.5% of a fluorinated polymer according to the invention, 10–95% by weight, preferably 25 to 40% of a resin, 0–90% by weight preferably 20 to 50% of water and/or non-aqueous liquid and 0–15% by weight preferably 1 to 5% of dispersant. Very good results have been achieved with a dispersant which mainly consists of these components.

The invention will now be illustrated by some examples.

EXPERIMENTAL

General Procedure for Fluorinated Intermediates
Intermediate A:

Under a nitrogen atmosphere, maleic anhydride (8.6 g, 1 equivalent) and Zonyl FSO-100 (MW ca. 725, 64 g, 1 equivalent) were placed in a reactor at room temperature and heated to 120° C. in one hour. No solvent or catalyst were added. After 3 h the intermediate A was obtained as a yellowish liquid.

In a similar way the following intermediates (B to F) were prepared:
Intermediate B: with 4 g of maleic anhydride and 18.1 g of Zonyl BA-L (MW ca. 443), yellow solid.
Intermediate C: with 16 g of maleic anhydride and 75.8 g of Fluowet EA800 (MW ca. 464), white solid.
Intermediate D: with 15.5 g of maleic anhydride and 150 g of Zonyl FSN-100 (MW ca. 950), waxy solid.

Intermediate E: with 2.84 g of citraconic anhydride and 11.35 g of Fluowet EA 612 (MW ca. 448), white solid.

Intermediate F: with 5.66 g of maleic anhydride and 27.45 g of Foralkyl EOH-6N-LW (MW ca. 475), white solid.

Intermediate G: Under a nitrogen atmosphere, maleic anhydride (5.66 g, 1 equivalent), xylene (60 g), Foralkyl EON-6N-LW (54.83 9, MW ca. 475, 2 equivalents) and toluene-4-sulphonic acid (0.5 g) are refluxed. The reaction water is distilled off under azeotropic conditions. The esterification is complete when the calculated amount of reaction water is separated. After the solvent removal, the intermediate C is obtained as a yellowish wax.

Legend to Chemical Compositions of Trade Mark Fluoroalcohols:

Zonyl BA-L: mixture of linear fluoroalcohols $R_fCH_2CH_2OH$ with $Rf=C_4F_9 < 4\%$, $C_6F_{13}$ 50+/−3%, $C_8F_{17}$ 29+/−2%, $C_{10}F_{21}$ 11+/−2% and fluorinated compounds $C_{12}F_{25}$ less than 6%. The average MW of the mixture is 443 g/mol; the mixture is originating from DuPont Zonyl FSO-100: mixture of ethoxylated linear fluoroalcohols $R_fCH_2CH_2O(CH_2CH_2O)yH$ with y=0 to 15, $Rf=C_4F_9 < 4\%$, $C_6F_{13}$ 50+/−3%, $C_8F_{17}$ 29+/−2%, $C_{10}F_{21}$ 11+/−2% and floroinated compounds $C_{12}F_{25}$ less than 6%. The average MW of the mixture is 725 g/mol; the mixture is originating from DuPont Zonyl FSN-100: mixture of ethoxylated linear fluoroalcohols $R_fCH_2CH_2O(CH_2CH_2O)yH$ with y=0 to 25, $Rf=C_6F_{13}$ 50<6%, $C_8F_{17}$ 50+/−3%, $C_{10}F_{21}$ 29+/−2%, $C_{12}F_{25}$ 11+/−2% and $C_{14}H_{29} < 4\%$. The average MW of the mixture is 950 g/mol; the mixture is originating from DuPont. Fluowet EA800: linear fluoroalcohol $C_8F_{17}CH_2CH2OH > 98\%$ with MW of 464 g/mol; originating from Clariant.

Fluowet EA 612: mixture of linear fluoroalcohols $R_fCH_2CH_2OH$ with $Rf=C_6F_{13}$ 42+/−4%, $C_8F_{17}$ 31+/−3%, $C_{10}F_{21}$ 14,5+/−2,5% and fluorinated compounds $C_{12}F_{25}$ less than 10% and the average MW of the mixture is 448 g/mol; the mixture is originating from Clariant.

Foralkyl EON-6N-LW: mixture of linear fluoroalcohols $R_fCH_2CH_2OH$ with $Rf=C_6F_{13}$ 45+/−10%, $C_8F_{17}$ 36+/−10%, $C_{10}F_{21}$ 12+/−5% and fluorinated compounds $C_{12}F_{25}$ less than 10% and the average MW of the mixture is 475 g/mol; the mixture is originating from Atofina.

Fluorad FC 10: mixture of linear fluoroalcohols: N-ethyl perfluorooctane sulphonamidoethyl alcohol 85+/−5%, N-ethyl perfluoro $C_4$–$C_7$alkyl sulphonamidoethyl alcohols 15+/−5% and the average MW of the mixture is ca. 575 glmol; the mixture is originating from 3M.

Levelling Agent:

General Procedure for Synthesis of Acrylic Polymers

EXAMPLE 1

Xylene (30 g) was placed in a three necked flask under a nitrogen atmosphere and heated to reflux (140° C.). The premix consisting of 76.18 g n-butylacrylate, 21.13 g of iso-butylmethacrylate, 0.73 g of intemediate A and 1.96 g of di-tert-butyl peroxide was added during 3 hours. After addition of the premix, the contents of the flask were stirred for another 4 hours at 140° C. The solid content was corrected to 70% by addition of 6 g of xylene to obtain a yellowish clear liquid. The calculated molecular weight of the prepared polymer was approximately 3700 g/mol (Mn).

In the following examples a similar polymerisation procedure was followed

EXAMPLE 2

Levelling agent with the following premix:

| | |
|---|---|
| n-butylmethacrylate | 65.08 g |
| iso-butylacrylate | 21.46 g |
| methacrylic acid | 9.00 g |
| intermediate B | 2.21 g |
| di-tert-butyl peroxide 60% in s-butanol, yellowish, slightly hazy liquid | 2.25 g |

The mixture was polymerised as described in Example 1.

EXAMPLE 3

Levelling agent: with the following premix:

| | |
|---|---|
| n-butylacrylate | 85.40 g |
| ethylhexylacrylate | 11.89 g |
| intermediate C | 0.91 g |
| di-tert-butyl peroxide 50% in xylene/s-butanol (4:1), yellowish, slightly hazy liquid | 1.80 g |

The mixture was polymerised as described in Example 1. The calculated molecular weight of the prepared polymer was approximately 4000 g/mol (Mn).

EXAMPLE 4

Anti-cratering agent with the following premix:

| | |
|---|---|
| iso-butylmethacrylate | 14.38 g |
| methacrylic acid | 15.23 g |
| n-butylacrylate | 51.90 g |
| intermediate A | 16.54 g |
| t-butyl peroxy-2-ethylhexanoate 60% in s-butanol, clear slightly yellow liquid | 1.95 g |

The mixture was polymerised as described in Example 1.

EXAMPLE 5

Anti-cratering agent with the following premix:

| | |
|---|---|
| iso-butylmethacrylate | 14.38 g |
| methacrylic acid | 15.23 g |
| n-butylacrylate | 51.90 g |
| intermediate D | 16.54 g |
| t-butyl peroxy-2-ethylhexanoate 75% in xylene, yellowish, slightly hazy liquid | 1.95 g |

The mixture was polymerised as described in Example 1.

EXAMPLE 6

Anti-cratering agent with the following premix:

| | |
|---|---|
| n-butylacrylate | 65.71 g |
| iso-butylmethacrylate | 18.16 g |
| intermediate E | 14.19 g |
| di-tert-butyl peroxide 50% in xylene, yellowish, slightly hazy liquid | 1.94 g |

The mixture was polymerised as described in Example 1.

EXAMPLE 7

Anti-cratering agent: in situ addition, with the following premix:

| | |
|---|---|
| n-butylacrylate | 65.71 g |
| iso-butylmethacrylate | 18.16 g |
| maleic anhydride | 2.07 g |
| di-tert-butyl peroxide 60% in xylene | 1.94 g |

Conditions were as in Example 1, but the fluorinated compound, Fluorad FC 10 (MW ca. 575) was added after polymerisation of the premix in an amount of 12.12 g to the reaction mixture at 100° C. and stirred for 6 hours, to obtain the final product as a yellowish liquid.

EXAMPLE 8

Anti-cratering agent with the following premix:

| | |
|---|---|
| iso-butylmethacrylate | 12.46 g |
| methacrylic acid | 13.24 g |
| n-butylacrylate | 42.35 g |
| intermediate F | 30.00 g |
| t-butyl peroxy-2-ethylhexanoate 50% in sec-BuOH/IPA (3:2), yellowish slightly hazy liquid | 1.95 g |

The mixture was polymerised as described in Example 1.

EXAMPLE 9

Polyethyleneglycol monomethylether Mw 350 (60.0 g) and intermediate F (19.6 g) were added to a three necked flask under a nitrogen atmosphere and heated to 120° C.

The premix, consisting of 94.2 g of n-butylacrylate, 15.3 9 of acrylic acid and 10.9 g of tert-butylperoxybenzoate, was added during 3 hours. After addition of the premix, the content of the flask was stirred for another 4 hours at 120° C. The resulting polymer is a slightly hazy yellowish liquid.

The polymer was neutralised with 134.0 g of aqueous KOH solution (concentration 11%), resulting in a yellowish clear liquid with 45% of active substance.

APPLICATION TESTS

Example A1

Aqueous Lacquer: Acrylic Emulsion

| | | |
|---|---|---|
| Joncryl 8051 | 90.74 g | |
| Aqueous Colour Paste with 40% Heliogen Blue L 7072 D | 0.91 g | |
| Water | 8.15 g | |
| EFKA-2526 | 0.2 g | 100 g |
| Example 2 | 1.0 g | |
| Dimethylaminoethanol | 0.1 g | |

The components were added in sequence, and stirred under a dispermat at 2000 rpm for 5 minutes. The samples were applied as a draw-down with a 75µ bar coater on polyester foil. After air drying the levelling was checked visually and showed a significant better levelling than a sample being treated with a comparison lacquer composition that contained the same ingredients, with exception of the fluorinated polymer of Example 2 and the neutralising amine.

Example A2

Solvent-Based Lacquer: Polyurethane

| | | |
|---|---|---|
| Macrynal SN 510 | 88.6 g | |
| Butylacetate | 9.9 g | |
| EFKA-2018 | 1.5 g | 100 g |
| Example 1 | 1.0 g | |

The components were added in sequence, and stirred by hand until homogeneous. Then the hardener (35 g of Desmodur N75 on above formulation) was added and stirred by hand until homogeneous. The samples were applied as a draw-down with a 75µ bar coater on polyester foil. The levelling was checked visually after 24 h of air-drying and showed a significant better levelling than a sample being treated with a comparison lacquer composition that contained the same ingredients, with exception of the fluorinated polymer of Example 1.

Example A3

Solvent-Based Lacquer: Polyurethane

| | | |
|---|---|---|
| Macrynal SN 510 | 88.6 g | |
| BuOAc | 9.9 g | |
| EFKA-2018 | 1.5 g | 100 g |
| Example 8 | 0.2 g | |

The components were added in sequence, and stirred under a dispermat at 4000 rpm for 15 minutes. Then the hardener (35 g of Desmodur N75 on above formulation) was added and stirred by hand until homogeneous. The samples were applied as a draw-down with a 75µ bar coater on polyester foil. The levelling was checked visually after 24 h of air-drying. After air drying the levelling was checked visually and showed significantly better levelling than a sample being treated with a comparison lacquer composition that contained the same ingredients, with exception of the fluorinated polymer of Example 8.

Example A4

Solvent-Based Lacquer: Stoving Alkyd Melamine

| | | |
|---|---|---|
| Vialkyd AC 451 | 54.0 g | |
| Solvesso 100 | 16.7 g | |
| Maprenal F 650 | 29.0 g | |
| EFKA-3033 | 0.30 g | 100 g |
| Example 7 | 0.20 g | |

The components without Example 7 were added in sequence, and stirred by hand until homogeneous. Two samples were applied as a draw-down with a 75μ bar coater on polyester foil. After 10 minutes of flash-off time, the samples were cured by 30 minutes baking at 135° C. A second layer, one containing Example 7 and one without, was applied with the same film thickness over the first layer and cured under the same conditions including flash-off time. The levelling and wetting were checked visually and compared with a comparison lacquer composition that contained the same ingredients, with exception of the fluorinated polymer of Example 7. The lacquer comprising the fluorinated polymer of Example 7 showed a much better levelling and wetting.

Example A5

Solvent Based Lacquer: Epoxy

| | | |
|---|---|---|
| Epoxy formulation: | | |
| Epikote 1001 | 80.5 g | |
| Xylene | 9.2 g | |
| Isobutanol | 3.1 g | |
| Butylglycol | 6.2 g | |
| EFKA-2021 | 1.0 g | 100 g |
| Example 6 | 0.2 g | |
| Hardener formulation: | | |
| Eurodur 115/70X | 63.1 g | |
| Xylene | 6.9 g | |
| Isobutanol | 30.0 g | 100 g |

The components were added in sequence, and stirred by hand until homogeneous. Then 68.7 g of the hardener (see formulation above) was added on above epoxy formulation and stirred by hand until homogeneous. The samples were applied as a draw-down with a 75μ bar coater on polyester foil. The levelling was checked visually after 24 h of air-drying. The sample showed better levelling than the comparison sample without addition of the polymer of Example 6.

The invention claimed is:

1. A process for levelling a liquid resin system by adding a co-polymer as a levelling agent to the liquid resin system, said co-polymer comprising 0.5–4% by weight of the co-polymer of a fluorinated unit represented by formula I,

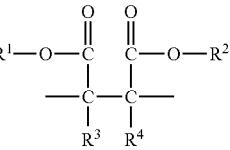

(Formula I)

wherein $R^1$ is a moiety selected from the group consisting of $C_nF_{2n+1}-(CH_2)_m-$, $AC_nF_{2n}-(CH_2)_m-$, $C_nF_{2n+1}-(CH_2)_m-(OCH_2CHR^5)_p-$, $AC_nF_{2n}-(CH_2)_m-(OCH_2CHR^5)_p$, $C_nF_{2n+1}-(CH_2)_m-X-$, $AC_nF_{2n}-(CH_2)_m-X-$, $AC_nF_{2n}-(CH_2)_m-(OCH_2CHR^5)_p-X$ or $C_nF_{2n+1}-(CH_2)_m-(OCH_2CHR^5)_p-X-$;

wherein A is selected from the group consisting of H, Cl, Br, I, $C_{1-12}$ alkyls and $OC_{1-12}$ alkyls, wherein $4 \leq n \leq 20$, $0 \leq m \leq 4$ and $0 \leq p \leq 20$, wherein X is a spacer moiety selected from the group consisting of esters, amides, sulphoamides, mercapto groups, polyurethane groups and alkyl groups, wherein $R^2$ is selected from the group consisting of H, metal moieties, (alkyl)ammonium moieties, alkyl groups, $C_nF_{2n+1}-(CH_2)_m-$, $AC_nF_{2n}-(CH_2)_m-$, $C_nF_{2n+1}-(CH_2)_m-(OCH_2CHR^5)_p-$, $AC_nF_{2n}-(CH_2)_m-(OCH_2CHR^5)_p$, $C_nF_{2n+1}-(CH_2)_m-X-$, $AC_nF_{2n}-(CH_2)_m-X-$, $AC_nF_{2n}-(CH_2)_m-(OCH_2CHR^5)_p-X$ and $C_nF_{2n+1}-(CH_2)_m-(OCH_2CHR^5)_p-X-$;

wherein A is selected from the group consisting of H, Cl, Br, I, $C_{1-12}$ alkyls and $OC_{1-12}$ alkyls, wherein $4 \leq n \leq 20$, $0 \leq m \leq 4$ and $0 \leq p \leq 20$, wherein X is a spacer moiety selected from the group consisting of esters, amides, sulphoamides, mercapto groups, polyurethane groups and alkyl groups, wherein $R^3$ and $R^4$ are independently selected from the group consisting of H, alkyl-groups and phenyl-groups and wherein $R^5$ selected from the group consisting of H and methyl groups, said co-polymer further comprising alkyl(meth)acrylate units, and wherein 90–100% of the fluorinated units are mono-esters; and wherein 70–100% of the fluorinated units of the co-polymer are represented by formula I wherein n is 6–8.

2. A process according to claim 1, wherein the alkyl(meth)acrylate units of the co-polymer are selected from the group consisting of n-propyl(meth)acrylate, 2-methyl cyclohexyl methacrylate, ethylene glycol mono-methacrylate, iso-butyl methacrylate, o-cresyl methacrylate, t-butvl methacrylate, n-butyl methacrylate, methyl methacrylate, iso-propyl methacrylate, s-butyl methacrylate, 2-ethylhexyl methacrylate and methacrylic acid.

3. A process according to claim 1, wherein m is 2.

4. A process according to claim 1, wherein p is 0 or 6 to 8.

5. A process according to claim 1, wherein $R^1$ and/or $R^2$ is a linear fluoroalkyl moiety.

6. A co-polymer comprising 0.5–4% by weight of the co-polymer of a fluorinated monomeric unit represented by formula I of claim 1, said polymer further comprising alkyl(meth)acrylate units, and wherein 90–100% of the fluorinated monomeric units are mono-esters; and wherein 70–100% of the fluorinated units of the polymer are represented by formula I wherein n is 6–8.

7. A co-polymer according to claim 6, wherein the alkyl (meth)acrylate units are selected from the group consisting of n-propyl(meth)acrylate, iso-propyl(meth )acrylate, n-butyl(meth)acrylate, sec-butyl(meth)acrylate tert-butyl(meth)acrylate, iso-butyl(meth)acrylate, ethylhexyl(meth)acrylate and (meth)acrylic acid.

8. A co-polymer according to claim 6, wherein $R^1$ is a linear fluoroalkyl moiety.

9. A co-polymer according to claim 6, which has the form of a random copolymer or a block copolymer.

10. A co-polymer according to claim 6, which has a number average molecular weight in the range of 1,000 to 50,000 g/mol.

11. A co-polymer according to claim 6, with a polydispersity ($M_w/M_n$) in the range of 1 to 4.

12. A co-polymer according to claim 6, which is a living polymer.

13. A co-polymer according to claim 6, in the form of a liquid or solid, which is soluble in an organic solvent or directly in water, or soluble in water after neutralization of acidic moieties.

14. A coating, printing ink or plastic compound comprising a co-polymer according to claim 6, a pigment and optionally a dispersant.

15. A coating, printing ink or plastic compound according to claim 14, comprising an extender.

16. A dispersion, comprising 0 to 85% by weight of a pigment and/or extender, 0.1 to 5% by weight of a co-polymer according to claim 8, 10 to 95% by weight of a resin, 0 to 90% by weight of water and/or non-aqueous liquid and 0 to 15% by weight of a dispersant.

17. An article treated with a co-polymer according to claim 6.

18. An article treated with a coating, plastic compound or printing ink according to claim 14.

19. An article treated with a dispersion according to claim 16.

* * * * *